United States Patent [19]

Kobayashi et al.

[11] Patent Number: 5,301,076
[45] Date of Patent: Apr. 5, 1994

[54] AUTOMATIC DISK SELECTING APPARATUS

[75] Inventors: Takashi Kobayashi, Tokyo; Sakae Tamachi, Matsudo; Yoshio Ohashi, Matsudo; Kouji Yoshino, Matsudo; Haruhisa Tobitani, Matsudo, all of Japan

[73] Assignees: NKK Corporation, Tokyo; Nikkyo Seisakusho Co., Ltd., Chiba, both of Japan

[21] Appl. No.: 923,922
[22] PCT Filed: Dec. 28, 1990
[86] PCT No.: PCT/JP90/01730
 § 371 Date: Sep. 4, 1992
 § 102(e) Date: Sep. 4, 1992
[51] Int. Cl.⁵ .............................................. G11B 17/08
[52] U.S. Cl. .................................... 360/98.06; 369/36
[58] Field of Search ................. 369/39, 36; 360/98.06, 360/98.04, 98.05

[56] References Cited

U.S. PATENT DOCUMENTS

| 3,130,393 | 4/1964 | Gutterman. | |
|---|---|---|---|
| 4,504,936 | 3/1985 | Faber et al. | 360/98.06 |
| 4,903,252 | 2/1990 | Tanaka et al. | 360/98.06 |
| 5,001,582 | 3/1991 | Numasaki | 360/98.06 |
| 5,099,466 | 3/1992 | Kimura | 369/39 |

FOREIGN PATENT DOCUMENTS

| 0148505 | 7/1985 | European Pat. Off. . |
|---|---|---|
| 0353502 | 2/1990 | European Pat. Off. . |
| 57-037775 | 3/1982 | Japan . |
| 60-177465 | 9/1985 | Japan . |
| 60-253058 | 12/1985 | Japan . |
| 61-61262 | 3/1986 | Japan . |
| 61-156563 | 7/1986 | Japan . |
| 63-269373 | 11/1988 | Japan . |

OTHER PUBLICATIONS

IBM Technical Disclosure Bulletin, vol. 20, No. 2, Jul. 1977, New York, pp. 691-692, E. D. Barkhuff et al, Transducing Separation of Slidably Mounted Flexible Disk Pack.

Primary Examiner—Thomas E. Denion
Attorney, Agent, or Firm—Frishauf, Holtz, Goodman & Woodward

[57] ABSTRACT

An automatic disk selecting apparatus receives a plurality of storage cases in which disks are stored. The storage cases are arranged in the front portion of a body case, and are movable in the right and left directions. A player is arranged behind the body case and is movable back and forth, and right and left. One of the storage cases is selected by a disk selecting unit and is fixed, while the other storage cases are moved in the right and left directions to form a space for inserting the player. The player is moved into the space, and a disk stored in the selected storage case is clamped, thereby reproducing information recorded on the disk. The system is small in size, provides improved disk handling, and provides decreased access time.

4 Claims, 8 Drawing Sheets

5,301,076

AUTOMATIC DISK SELECTING APPARATUS

TECHNICAL FIELD

The present invention relates to an automatic disk selecting apparatus for selecting one of a plurality of disks and reproducing information recorded on the selected one of the disks by a player.

BACKGROUND ART

A conventional automatic disk exchanging apparatus as shown in FIG. 11, is disclosed in Published Unexamined Japanese Patent Application No. 61-156563.

The automatic disk exchanging apparatus has the following structure. Disks 201 are put in a main tray mechanical unit 200. To select a predetermined disk, a disk playing mechanical unit 700 moves to a predetermined position in the Y directions, and a disk carrying mechanism 600 operates to pick out the disk from the tray mechanical unit, carry the disk in the X directions, and mounts it on the disk playing mechanical unit. Information recorded on the disk is thus reproduced.

The above conventional apparatus has the following drawbacks.

1) Precision is required for control of positioning to select a disk. A handling mechanism cannot be quickly moved since it directly handles the disk which is circular. Since the handling mechanism has to perform two operations of clamping and release in order to handle the disk, time (access time) required for removing the disk from the tray mechanical unit and mounting it on the playing mechanical unit is very long, i.e., about 10 seconds.
2) Since a space for carrying the disk is necessary, the apparatus is increased in size.
3) Since the circular disk has to be handled directly, the clamping and holding mechanisms are complicated, with the result that the apparatus is easy to malfunction and expensive.
4) Since the apparatus does not have a mechanism for reversing the disk, information recorded on both sides of the disk cannot be reproduced.

SUMMARY OF THE INVENTION

The present invention has been developed to resolve the above drawbacks of the conventional apparatus and its object is to provide a small-sized automatic disk selecting apparatus whose access time is short, structure is simple, and reliability is high.

An automatic disk selecting apparatus according to the present invention comprises: a disk supporting mechanism arranged in front of a body case, for keeping a plurality of storage cases for storing disks in a vertical state and supporting the storage cases movably in right and left directions; a disk selecting unit arranged behind the disk supporting mechanism and driven in the right and left directions, the disk selecting unit including a fixing mechanism for fixing a selected one of the plurality of storage cases supported by the disk supporting mechanism and a pair of select levers for moving the storage cases other than the selected one of the plurality of storage cases in the right and left directions; a player moving unit arranged behind the body case, for keeping a player having a disk clamp mechanism in a vertical state and moving the player in the right and left directions; and a disk returning mechanism arranged above the disk supporting mechanism and including a pair of returning arms for returning the disk storage cases moved in the right and left directions by the disk selecting unit to an initial position.

The disks are stored in the storage cases one by one and supported by the supporting mechanism so that they can be moved in the right and left directions. Since the storage cases other than the selected storage case are moved in the right and left direction by the select levers of the disk selecting unit, the supporting mechanism is considerably simpler than that of the conventional apparatus in which a circular disk is directly handled.

The player is moved by the player moving unit to the selected storage case fixed by the fixing mechanism of the disk selecting unit, and the disk stored in the storage case is clamped by the clamp mechanism, thereby reproducing information from the disk. The apparatus of the present invention can thus be made more compact than the conventional apparatus. By virtue of the structure of the disk selecting unit, the access time can be shortened much more than that of the conventional apparatus.

Furthermore, information recorded on both sides of the selected disk can be reproduced by reversely rotating the player using the player moving unit.

DETAILED DESCRIPTION

An embodiment of the present invention will now be described with reference to the accompanying drawings.

Figure 1:
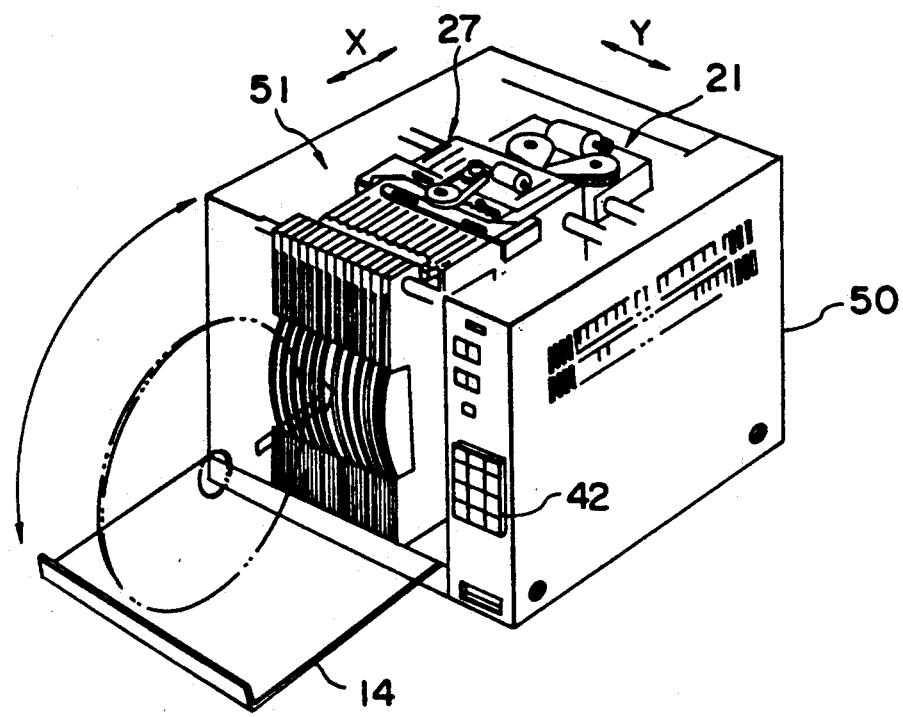
FIG. 1 is a perspective view of an automatic disk selecting apparatus according to one embodiment of the present invention.
Figure 2A:
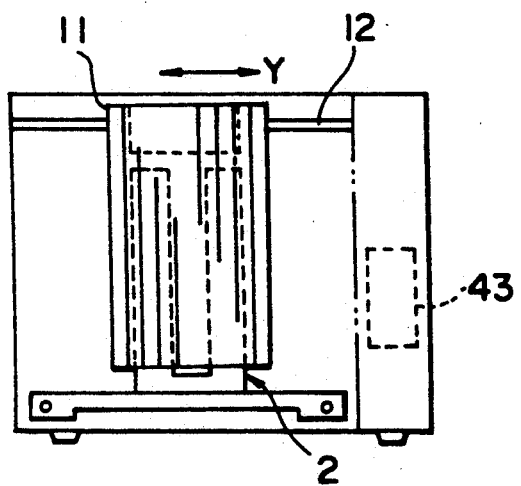
FIGS. 2A and 2B are respectively front and side views of the apparatus shown in FIG. 1.
Figure 2B:
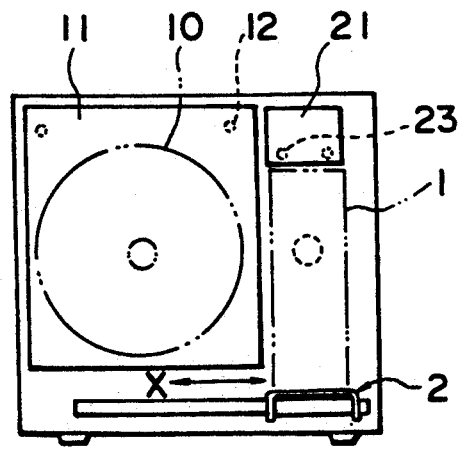

First, an outline of the entire structure of an automatic disk selecting apparatus according to the embodiment of the present invention will be described with reference to FIGS. 1, 2A and 2B.

Disks 10 are stored in a plurality of storage cases 11 one by one A supporting mechanism 51 for supporting the cases 11 movably in the right and left (Y) directions is provided in front of a body case 50. The disks 10 stored in the storage cases 11 are exchanged with one another by opening a door 14 provided in the front of the body case.

A disk selecting unit 21 having a fixing mechanism for fixing a selected one of the storage cases 11 and select levers for moving the storage cases other than the selected one of them in the right and left directions, is provided behind the body case 50 so that it can be moved in the right and left (Y) directions.

A player moving unit 2 for moving the player 1 back and forth, right and left in a vertical state and reversely rotating it, is provided behind the body case 50.

A disk returning mechanism 27 for returning the disk storage case 11 to the initial position is provided above a disk supporting mechanism 51.

A computer 43 for sequentially controlling an operation of each of the above structural elements is arranged in the body case 50, while its operation panel 42 is arranged in front thereof.

The respective structural elements of the apparatus will be sequentially described in detail with reference to the accompanying drawings.

Figure 3:
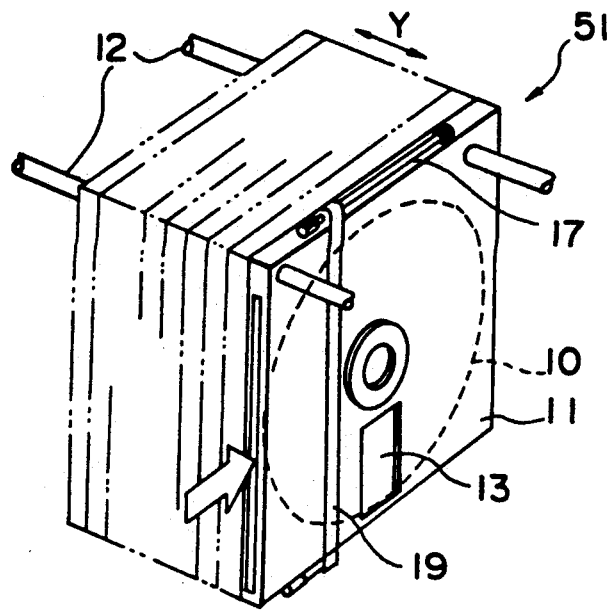
FIG. 3 is a perspective view of a disk supporting mechanism.

FIG. 3 is a perspective view of the disk supporting mechanism 51.

The disks 10 are stored in the storage cases 11 one by one. The storage cases 11 are supported movably in the right and left (Y) directions by means of two slide guides 12 passing through the body case. The storage cases 11 each have a window 13 for reading a signal when the player is mounted.

Figure 4:
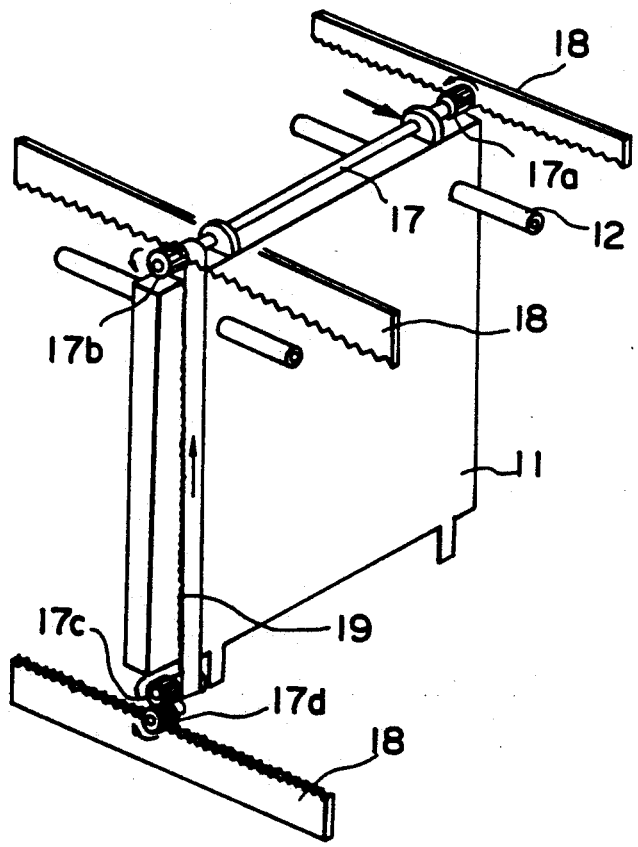
FIG. 4 is a view for explaining a supporting mechanism for supporting disk storage cases in a vertical state.

Further, the automatic disk selecting apparatus comprises a holding mechanism (FIG. 4) for vertically holding the storage cases 11 to guide them smoothly by the slide guides 12 when the storage cases 11 are moved in the right and left directions by the disk selecting unit 21 (which will be described in detail later). The holding mechanism is constructed as shown in FIG. 4. A shaft 17 having pinions 17a and 17b at its both ends is mounted on the top of the storage case 11. A pinion 17c is mounted on one end of the undersurface of the storage case 11. Three racks 18 pass on the body case. The pinions 17a and 17b are directly engaged with the racks 18, and the pinion 17c is engaged with the rack 18 with a pinion 17d interposed therebetween. A timing belt 19 is wound on the pinions 17b and 17c. When the storage case 11 is moved by the slide guides 12, the pinion 17c is rotated in synchronization with rotation of the pinion shaft 17. Since the storage case 11 is thus supported at the upper two points and the lower one point, it can be moved in the vertical state.

Figure 5:
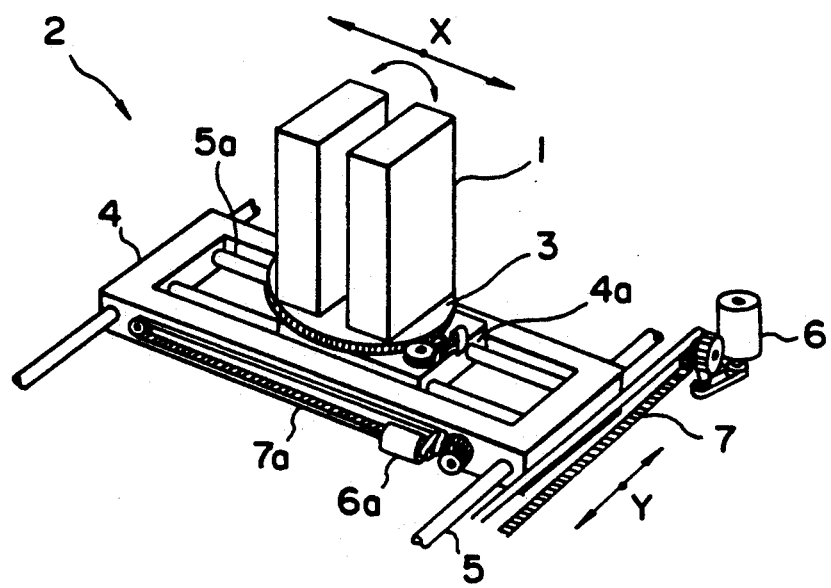
FIG. 5 is a perspective view of a player moving unit.
Figure 6:
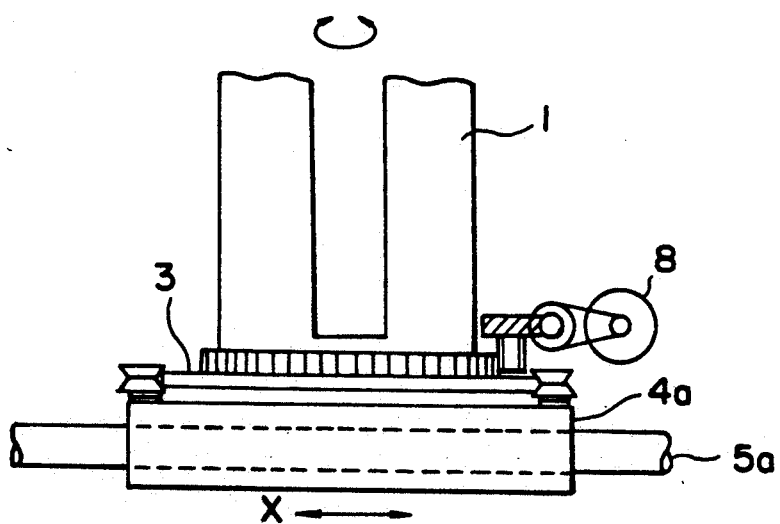
FIG. 6 is a view for explaining a player reversing mechanism.

The disk moving unit 2 will now be described, with reference to FIGS. 5 and 6.

The disk moving unit 2 includes a moving frame 4 moved in the right and left (Y) directions and a moving table 4a arranged on the moving frame 4 and moved in the back and forth (X) directions. The player 1 is mounted on the moving table 4a with a turn table 3 interposed therebetween so that the player can be reversely rotated.

The moving frame 4 is guided by a slide guide 5 passing through the body case and moved in the right and left (Y) directions by means of a timing belt 7 driven by a motor 6. Similarly, the moving table 4a is guided by a slide guide 5a and moved in the back and forth (X) directions by means of a timing belt 7a driven by a motor 6a. The player 1 is reversely rotated by a gear train driven by a motor 8.

Figure 7:
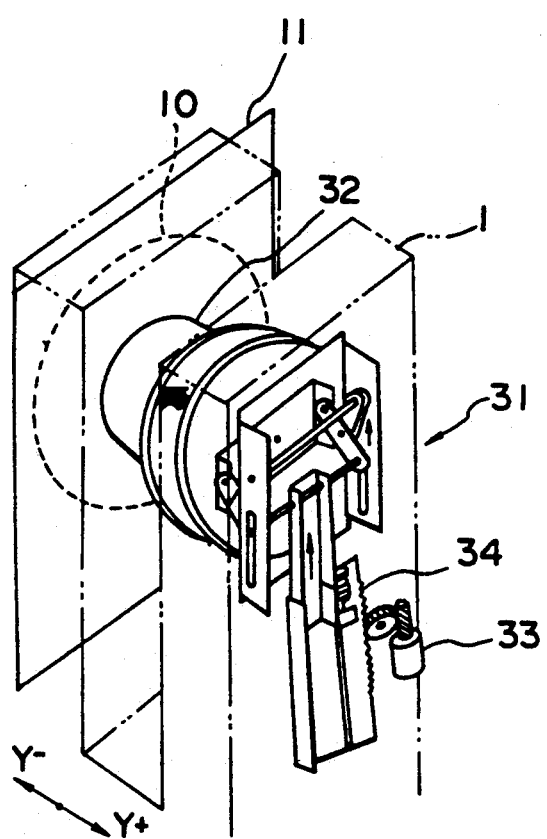
FIG. 7 is a perspective view of a disk clamp mechanism.

The player 1 includes a disk clamp mechanism 31 as shown in FIG. 7. The disk 10 is clamped and released by moving a spindle shaft 32 back and forth in the Y directions through a link by means of a rack 34 which is moved up and down by a motor 33.

Figure 8:
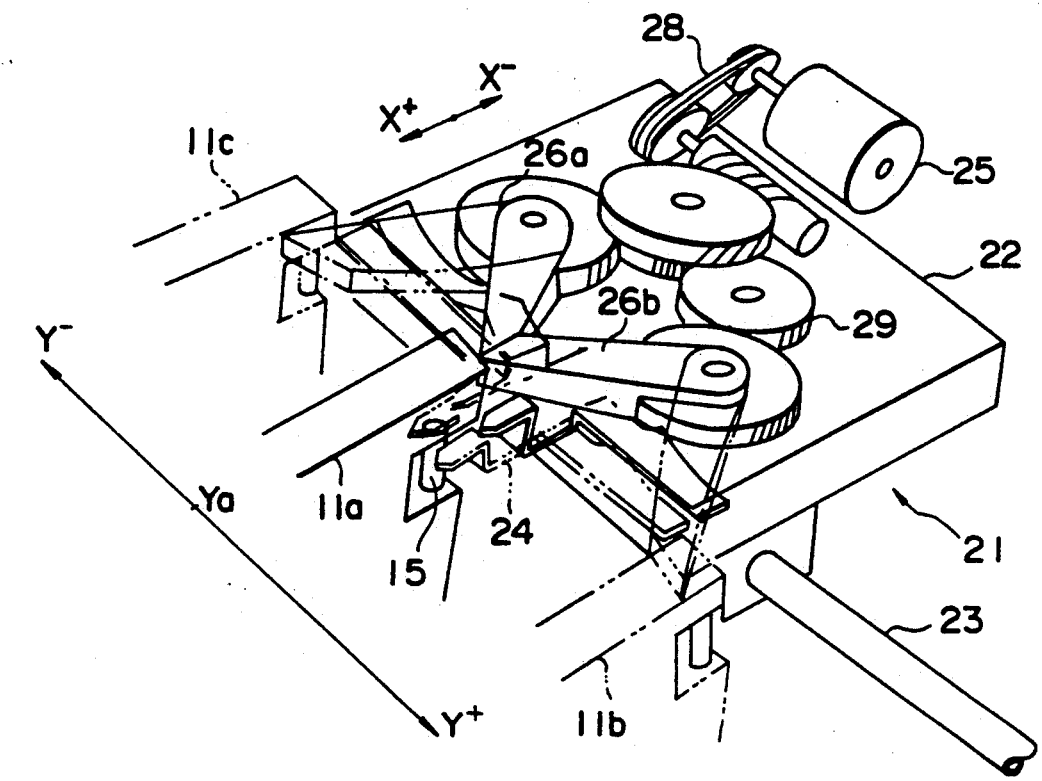
FIG. 8 is a perspective view of a disk selecting unit.

The disk selecting unit 21 will now be described, with reference to FIG. 8.

A base 22 is guided by a slide guide 23 and moved in the Y directions by the same mechanism as that for moving the above moving frame 4 in the Y directions.

A pole 15 is attached to the upper end of the disk storage case 11 to fix the storage case. A forked fixing mechanism 24 for holding the pole 15 is attached to one end of the base 22 in such a manner that it is moved back and forth in the X directions. A pair of select levers 26a and 26b each having an edge portion which is to be inserted between the poles 15 attached to the upper end of the disk storage case 11, is arranged on the base 22 so that the select levers can be rotated in directions opposite to each other. The select levers are rotated by means of a gear train 29 driven by a motor 25 and a belt 28, and the fixing mechanism 24 is moved back and forth by a pinion and a rack mechanism (not shown) driven by the motor 25.

The disk returning mechanism 27 will now be described, with reference to FIG. 9.

A pair of returning arms 28a and 28b each having an L-shaped end portion, is driven so that the returning arms are moved in directions opposite to each other by means of a gear train 30 driven by the motor 29.

Figure 10:
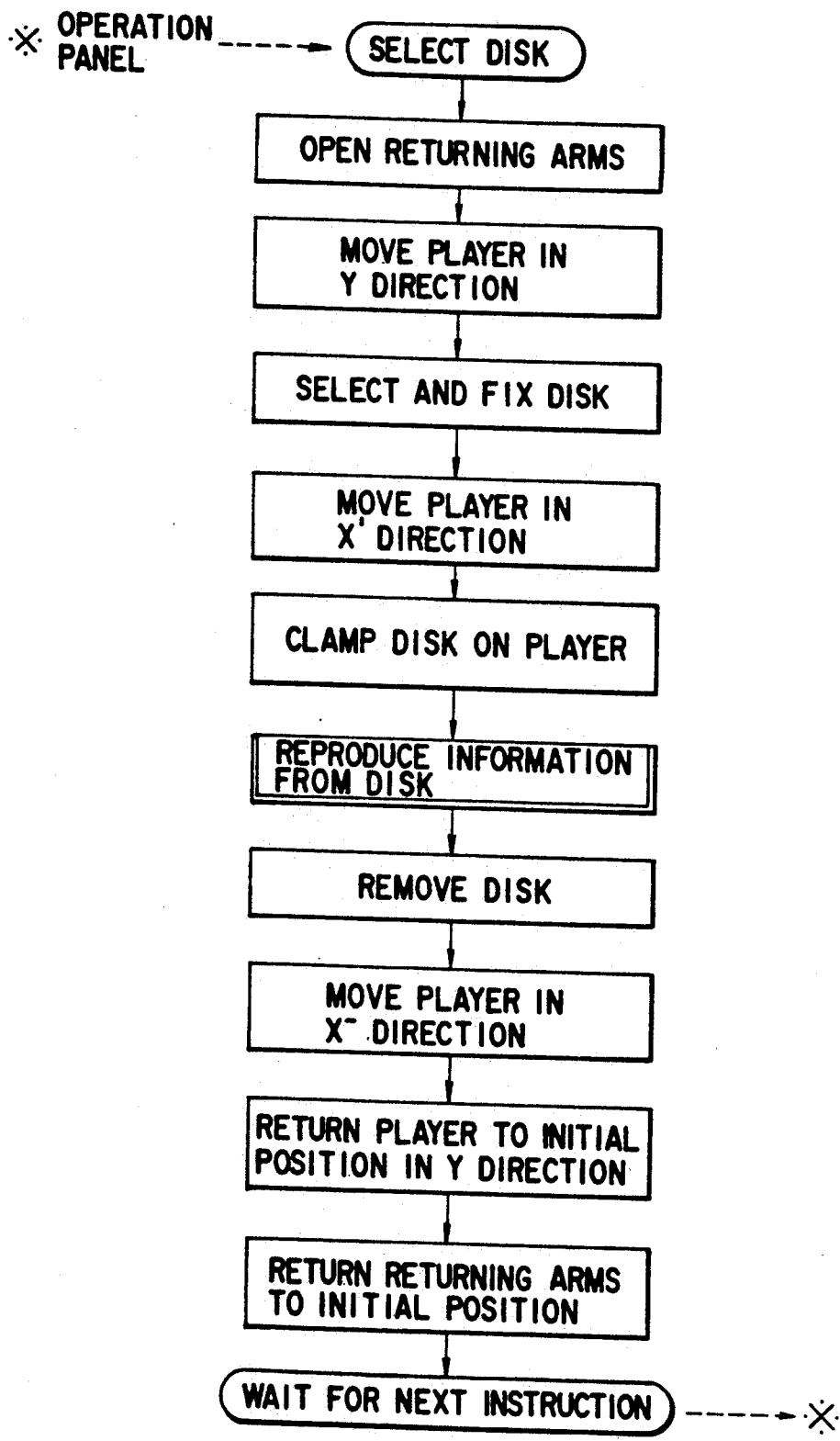
FIG. 10 is an operation flowchart.
Figure 11:
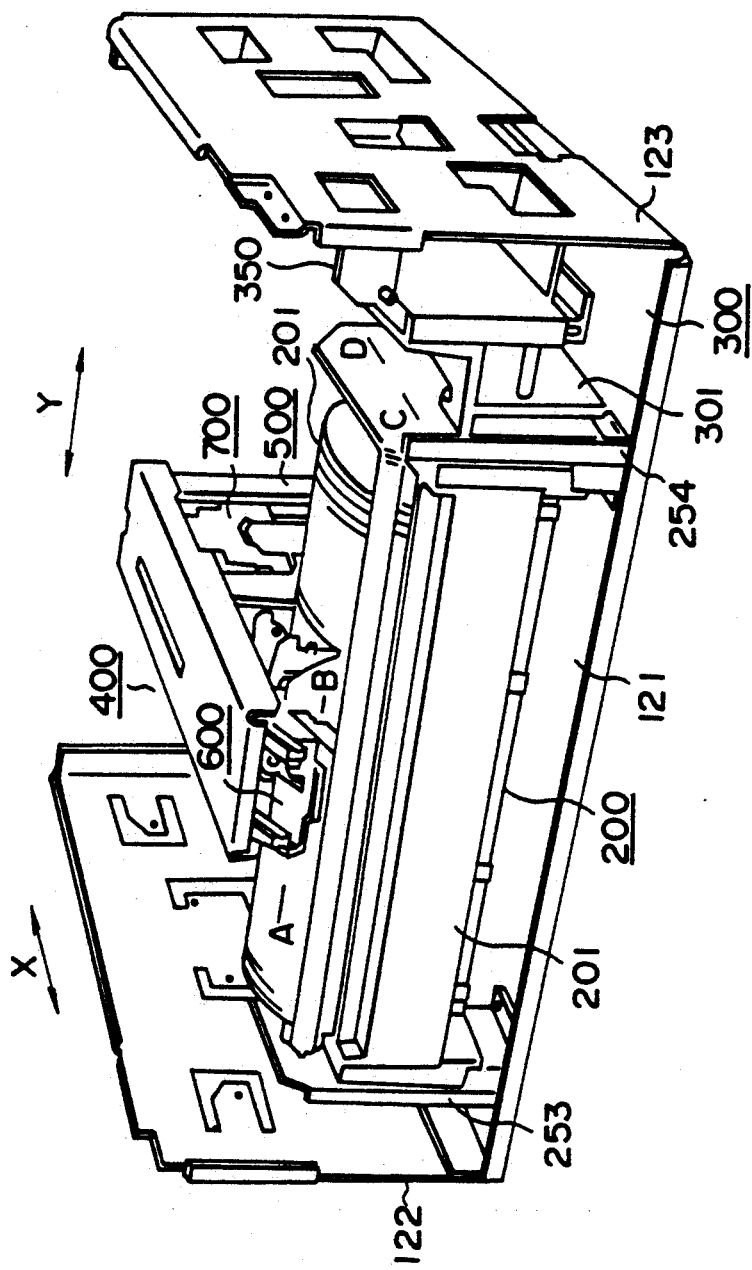
FIG. 11 is a perspective view of a conventional automatic disk exchanging apparatus.

As one operation of the apparatus of the present invention, reproduction of information recorded on a disk 10a stored in a storage case 11a will now be described. FIG. 10 is a flowchart showing an outline of the operation.

If the reproduction is instructed by an operation panel 42, the player moving unit 2 is operated to move the player 1 in the Y directions and stop it at Ya (in FIG. 8) where the player 1 coincides with the storage case 11a to be selected.

Figure 9:
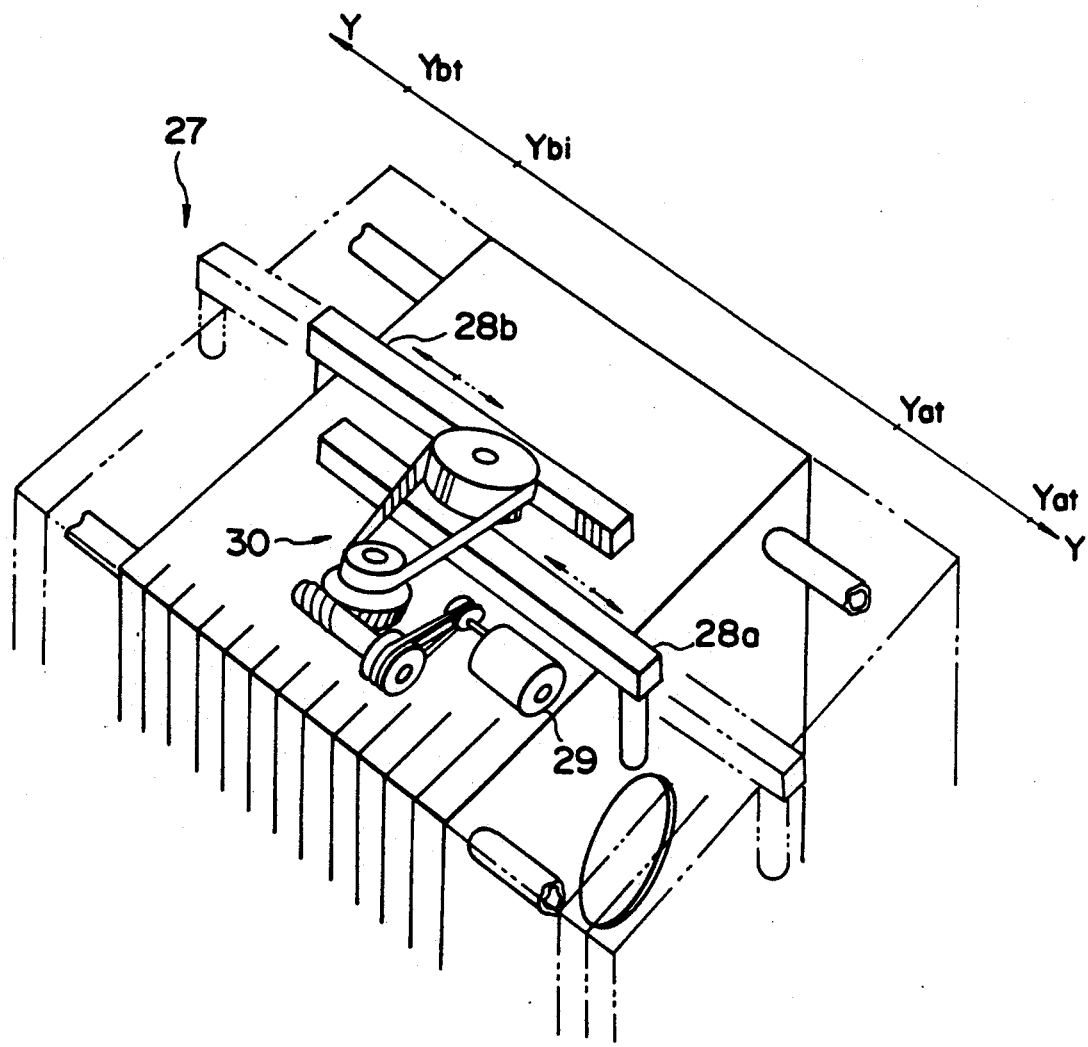
FIG. 9 is a perspective view of a disk returning mechanism.

The returning arms 28a and 28b of the disk returning mechanism 27 are opened to the positions indicated by one-dash-two-dot lines in FIG. 9. The end portions of the returning arms are fixed to positions Yat and Ybt.

Figure 8A:
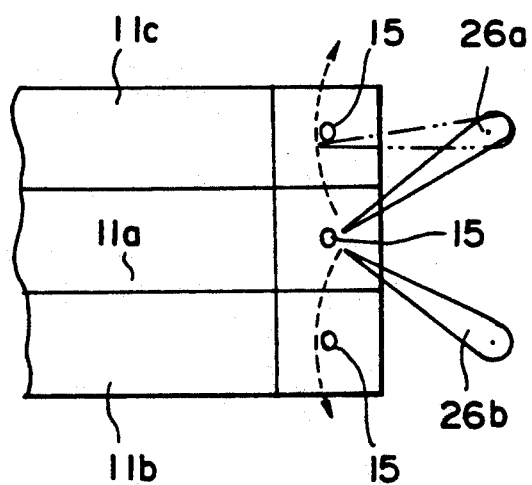
FIG. 8A is a view for explaining an operation of the disk selecting unit.

The base 22 of the disk selecting unit 21 is then moved in the Y directions to make the position of the fixing mechanism 24 coincident with the storage case 11a. The fixing mechanism 24 is moved in the X directions and engaged with the pole 15 of the storage case 11a, thereby fixing the storage case 11a. The select levers 26a and 26b are rotated as indicated by one-dash-two-dot lines in FIGS. 8 and 8A, and the storage cases other than the storage case 11a are moved in the Y directions by engaging the end portions of the select levers with the pole 15 to make a space, into which the player 1 is inserted, between the storage cases 11a and 11b and between the storage cases 11a and 11c.

The player 1 is moved in the X directions by the player moving unit 2 to make the center of the player coincident with that of the disk 10a. The disk 10a is clamped by the clamp mechanism 31 and mounted on the player 1.

In this state, information recorded on the disk 10a is reproduced as a voice by an external speaker, an image by an external TV set, etc.

After the reproduction, an operation opposite to the above is performed to return the storage case to the initial position and return the returning arms 28a and 28b to the positions indicated by solid lines in FIG. 9. Setting the end portions of the returning arms to the positions Yai and Ybi, the space between the storage cases is closed.

When the player 1 is designed to reproduce information recorded on both sides of a disk, the same operation as above can be performed. However, when the player 1 is designed to reproduce information recorded on only one side of a disk, the above operation has only to be performed after the player is returned to the X directions and reversely rotated.

The above operation is automatically performed by the computer 43 if necessary information is input using the operation panel 42.

If the disk 10 is exchanged with another disk, the disk exchange door 14 has only to be opened.

The present invention can be widely applied to not only a laser disk, a CD, a CD-ROM, and tracking and erasable optical disks, but also a magnetic disk such as a hard disk and a floppy disk.

Further, the present invention can be applied to disks having diameters of 12 in., 8 in., 5.25 in. and 3.5 in.

As described above, since the disks are stored in the storage cases one by one and supported by the supporting mechanism movably in the right and left directions, and the storage cases other than the selected one of them are moved in the right and left directions by the select levers of the disk selecting unit, the automatic disk selecting apparatus of the present invention is considerably simpler than the conventional apparatus in which a circular disk is directly handled.

Since the player moving unit moves the player to the storage case fixed by the fixing mechanism of the disk selecting unit, and the disk is clamped by the clamp mechanism to reproduce information recorded on the disk, the apparatus can be made smaller than the conventional apparatus. Furthermore, the access time can be decreased to about 5 seconds and is extremely shorter than that of the conventional apparatus.

Since the player is reversely rotated by the player moving unit, information recorded on both sides of the disk can be reproduced.

We claim:

1. An automatic disk selecting apparatus comprising:
   a disk supporting mechanism arranged in front of a body case, for keeping a plurality of storage cases for storing disks in a vertical state and supporting the storage cases such that the storage cases are movable in right and left directions;
   a disk selecting unit arranged behind said disk supporting mechanism and driven in the right and left directions, said disk selecting unit including;
      a fixing mechanism for fixing a selected one of said plurality of storage cases supported by said disk supporting mechanism; and
      a pair of select levers for moving the storage cases other than the selected one of said plurality of storage cases in the right and left directions;
   a player moving unit arranged behind the body case, for keeping a player having a disk clamp mechanism in a vertical state and moving the player in the right and left directions;
   a disk returning mechanism arranged above said disk supporting mechanism and including a pair of returning arms for returning the disk storage cases, which have been moved in the right and left directions by said disk selecting unit, to an initial position;
   a pole fixed to an upper end portion of each of said storage cases;
   a base on which said disk selecting unit is arranged, said base being driven in the right and left directions;
   said fixing mechanism of said disk selecting unit including a forked fixing member for holding said pole and driven back and forth;
   said pair of select levers being arranged symmetrically with respect to an axis of said fixing mechanism and being driven in such a manner that said select levers are opened and closed in directions opposite to each other;
   wherein said base is movable such that said fixing mechanism is located in front of one of the storage cases to be selected, said fixing mechanism is then advanced, said forked fixing member is engaged with and fixed to a pole of said one of the storage cases to be selected, said pair of select levers is opened and engaged at end portions thereof with poles of right and left storage cases of said one of the storage cases to be selected, and said right and left storage cases are moved in the right and left directions, thereby forming a space for inserting said player on each side of said one of the storage cases to be selected;
   a pair of pinions arranged above each of the storage cases;
   a pair of racks arranged above the storage cases and extending in the right and left directions of the body case and respectively engaged with said pair of pinions;
   a further pinion arranged below each of the storage cases and which is reversely rotated in synchronization with said pair of pinions; and
   a further rack arranged below the storage cases and extending in the right and left directions of the body case and engaged with said further pinion,
   whereby said racks and pinions maintain said storage cases in a vertical state and permit said storage cases to move in the right and left directions.

2. The automatic disk selecting apparatus according to claim 1, wherein said body case includes slide guides for guiding the storage cases for said movement in the right and left directions.

3. The automatic disk selecting apparatus according to claim 1, wherein said player moving unit includes means for reversely rotating the player.

4. The automatic disk selecting apparatus according to claim 1, wherein said case body includes a door provided in a front portion of said case body, said door being openable and closable.

* * * * *